(12) United States Patent
Mouleyre et al.

(10) Patent No.: US 10,369,971 B2
(45) Date of Patent: Aug. 6, 2019

(54) ADAPTER FOR CONNECTING A WIPER BLADE TO A DRIVING ARM

(71) Applicant: Valeo Systèmes d'Essuyage, Le Mesnil Saint Denis (FR)

(72) Inventors: Guillaume Mouleyre, Saint Genès Champanelle (FR); William Terrasse, Vic-le-Comte (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 139 days.

(21) Appl. No.: 15/195,163

(22) Filed: Jun. 28, 2016

(65) Prior Publication Data

US 2016/0375873 A1 Dec. 29, 2016

(30) Foreign Application Priority Data

Jun. 29, 2015 (FR) .................................... 15 56028

(51) Int. Cl.
*B60S 1/38* (2006.01)
*B60S 1/40* (2006.01)

(52) U.S. Cl.
CPC ........... *B60S 1/4038* (2013.01); *B60S 1/3806* (2013.01); *B60S 1/3853* (2013.01); *B60S 1/3874* (2013.01);
(Continued)

(58) Field of Classification Search
CPC ..... B60S 1/4003; B60S 1/4038–1/4048; B60S 2001/4051; B60S 2001/4054; B60S 1/407; B60S 1/4074; B60S 1/4064
See application file for complete search history.

(56) References Cited

U.S. PATENT DOCUMENTS

| 6,966,096 B2* | 11/2005 | Baseotto | B60S 1/32 |
| | | | 15/250.32 |
| 2006/0064842 A1* | 3/2006 | Verelst | B60S 1/38 |
| | | | 15/256.5 |

(Continued)

FOREIGN PATENT DOCUMENTS

| CN | 103108783 A | 5/2013 |
| DE | 102005019389 A1 | 11/2006 |

(Continued)

OTHER PUBLICATIONS

Preliminary Report and Written Opinion Issued in Corresponding French Application No. 1556028, dated Apr. 28, 2016 (6 Pages).

(Continued)

*Primary Examiner* — Andrew A Horton
(74) *Attorney, Agent, or Firm* — Osha Liang LLP

(57) ABSTRACT

The invention relates to an adapter 26 for connecting a wiper blade 12 to a driving arm, the adapter comprising two lateral longitudinal walls 42a, 42b spaced apart from one another so as to form therebetween at least one housing 45 configured in order to receive at least in part a connector 24 of the wiper blade, at least one of the lateral walls 42a, 42b comprising at least one hole 56, said lateral wall 42a, 42b further comprising a bearing means 54, 54a projecting from an external face 75 of the lateral wall 42a, 42b, characterized in that the bearing means 54, 54a is traversed by at least one hole 56, said bearing means 54, 54a being made as one with the external face 75 of the lateral wail 42a, 42b.

19 Claims, 8 Drawing Sheets

(52) U.S. Cl.
CPC ........... *B60S 1/3887* (2013.01); *B60S 1/4003* (2013.01); *B60S 1/407* (2013.01); *B60S 1/4048* (2013.01)

(56) References Cited

U.S. PATENT DOCUMENTS

| | | |
|---|---|---|
| 2012/0060316 A1 | 3/2012 | Avasiloaie et al. |
| 2012/0246859 A1* | 10/2012 | Schaeuble ............. B60S 1/3849 15/250.32 |
| 2013/0192016 A1* | 8/2013 | Kim ..................... B60S 1/3858 15/250.201 |
| 2014/0082876 A1 | 3/2014 | Avasiloaie et al. |
| 2014/0150200 A1* | 6/2014 | Bex ........................ B60S 1/387 15/250.32 |
| 2014/0338143 A1 | 11/2014 | Bousset et al. |

FOREIGN PATENT DOCUMENTS

| | | | |
|---|---|---|---|
| DE | 102011089922 A1 * | 6/2013 | ............. B60S 1/386 |
| DE | 102012209956 A1 | 12/2013 | |
| GB | 2231779 A * | 11/1990 | ............ B60S 1/4038 |

OTHER PUBLICATIONS

The First Office Action issued in corresponding Chinese Patent Application No. 201610808651.2 dated Apr. 26, 2018 (13 pages).

* cited by examiner

ADAPTER FOR CONNECTING A WIPER BLADE TO A DRIVING ARM

TECHNICAL FIELD

The present invention relates in particular to an adapter for connecting a wiper blade to a driving arm, in particular of a motor vehicle.

PRIOR ART

A motor vehicle is conventionally equipped with windscreen wipers for washing the windscreen and avoiding disruption to the driver's view of his surroundings. These windscreen wipers generally comprise a driving arm that carries out an angular to-and-fro movement and have elongate blades which themselves carry squeegee blades made of a resilient material. These squeegee blades rub against the windscreen and evacuate the water by removing it from the drivers field of view, The blades are produced in the form either, in a conventional version, of articulated brackets which hold the squeegee blade at a number of discrete locations, giving it a bend that allows it to follow whatever curvature the windscreen may have, or, in a more recent version, known as the "flat blade" version, of a semi-rigid assembly which holds the squeegee blade along its entire length by virtue of one or more bend-forming vertebrae making it possible to press the blade against the windscreen without having to use brackets.

The blade is attached to the driving arm by a connection system having a connector and an adapter. The connector is a piece which is secured to the blade and which is generally fastened directly to the squeegee blade or to the flat blade, whereas the adapter is secured to the arm. The adapter is an intermediate piece which allows the connector to be connected and fastened to the driving arm. It is generally configured in order to be inserted into a head or terminal piece, in the form of a yoke and having a U-shaped cross section, of the driving arm.

The connector and the adapter each comprise articulation means configured in order to interact with complementary means of the other member so as to define at least one transverse pivoting axis of the connector vis-à-vis the adapter, which is a pivoting axis of the blade vis-à-vis the arm. In the current art, one of the members, such as the connector, generally comprises a substantially cylindrical physical axis which defines the articulation axis and is received in a housing of complementary shape in the other member.

The adapter generally has a body configured in order to be inserted into the terminal piece of the arm such that this body extends at least in part between two substantially parallel lateral legs of the terminal piece. The body of the adapter is connected at one end to a head, on which the free end of the terminal piece abuts. Lastly, the body of the adapter generally comprises an actuation button engaged by elastic snap-fitting in a hole in the terminal piece, when this latter abuts on the head, in order to lock the adapter vis-à-vis the terminal piece in this position.

An adapter makes it possible to join a blade to a particular type of terminal piece or arm. In the case of the above-mentioned terminal pieces with a U-shaped cross section for example, several varieties thereof exist. These varieties are very similar in appearance, but differ from one another in terms of dimensions and, in particular, in terms of their widths or lateral dimensions, the width of a terminal piece being defined by the distance between the lateral legs of the terminal piece and, more precisely, by the distance between the external faces of these lateral legs. They also vary in terms of the positions of the holes designed to interact with the push buttons of the adapter.

In the current state of the art, there are as many varieties of adapter as there are varieties of terminal pieces or of ends of driving arms, which is neither practical nor economical. There is thus a genuine need for a universal adapter that can be mounted on at least two, and even more, terminal pieces of windscreen wiper arms.

Furthermore, it has been observed that, in the course of operation, the adapter may accidentally become detached from the connector owing to play at the level of the articulation pin of the adapter vis-à-vis the connector.

The invention proposes an improvement to the prior art.

SUMMARY OF THE INVENTION

To that end, the invention proposes an adapter for connecting a wiper blade to a driving arm, the adapter comprising two lateral longitudinal was spaced apart from one another so as to form therebetween at least one housing configured in order to receive at least in part a connector of the wiper blade, at least one of the lateral was comprising at least one hole, said lateral wall further comprising a bearing means projecting from an external face of the lateral wall, characterized in that the bearing means is traversed by at least one hole, said bearing means being made as one with the external face of the lateral wall.

The adapter according to the invention may be used as a universal adapter, as will be described in detail below, i.e. an adapter for at least two different driving arms such as, for example, at least one arm with a U-shaped terminal piece or end, at least one rod arm (generally without a terminal piece), at least one arm with lateral locking (a side-lock arm), etc.

The adapter according to the invention makes it possible to remedy the prior art problem of the accidental detachment of the adapter. Indeed, the projecting bearing means allow better holding, in particular lateral or transverse holding, of the adapter on the connector. They are configured in order to interact by bearing with complementary means of another element to prevent or to limit deformations of the adapter. They may, furthermore, be configured in order to stiffen the lateral walls of the adapter and to thereby reduce the flexibility thereof.

The adapter according to the invention may comprise one or more of the following features, taken individually or in combination with one another:
- the two lateral longitudinal walls are substantially parallel,
- each of the lateral walls comprises a through-hole of axis perpendicular to a longitudinal direction of the adapter,
- the hole(s) is (are) configured in order to receive at least one articulation pin of the adapter vis-à-vis the connector,
- the bearing means projecting from an external face of the lateral wall is configured in order to form at least one bearing surface in a direction transverse to a longitudinal direction of the adapter,
- said bearing means comprises at least bands of material projecting from the external surfaces of the lateral walls,
- said bands of material have an elongate form and extend longitudinally between lower longitudinal edges and upper longitudinal edges of the walls, said bands of material define bearing faces that are substantially parallel to one another, said bands of material are spaced apart from one another in a longitudinal direction of the adapter and distributed over said external faces in the same direction, each lateral wall comprises at least four of said bands of material, the bands of material traversed by the holes have a width measured in a longitudinal direction of the adapter that is less than that of the other bands of material, the bands of material traversed by the holes have a width measured in a longitudinal direction of the adapter that is less than the diameter of said holes, the bands of material all have substantially the same thickness measured in a direction perpendicular to a longitudinal direction of the adapter, the adapter is configured in order to be fastened selectively to a terminal piece of a first arm and to a terminal piece of a second arm, which is different from that of the first arm, said adapter comprising at one end a head defining at least a first bearing surface of a terminal piece part and/or at least a part of an engagement hole of a terminal piece part, the adapter comprises in particular at least one locking push button configured in order to interact with the terminal piece of said first and/or second arm, the adapter is configured in order to be fastened selectively to at least one connection member arranged in order to be fastened to at least one other arm.

The invention also covers a first assembly comprising an adapter according to any one of the features presented above and a connector secured to the wiper blade.

The invention further relates to a second assembly comprising an adapter as above and said connection member for a rod arm which is configured in order to cover at least in part said adapter, wherein said connection member comprises two lateral longitudinal was designed to extend substantially parallel to the lateral walls of the adapter, and comprising on their internal faces projecting means which are configured in order to bear in a transverse direction on the bearing means of the lateral walls of the adapter.

In this second assembly, the external faces of the lateral walls of the adapter are spaced in the transverse direction of internal lateral faces of the connection member owing to the mutual interaction of said bearing means.

According to another aspect, the invention covers a wiper blade or driving arm, characterized in that it comprises or carries an adapter according to one of the features listed above, or a first or second assembly likewise as mentioned.

The invention covers a third assembly comprising a driving arm and an adapter as presented above, or a first and/or second assembly presented above, the driving arm comprising a transverse spindle received in at least one of the holes of the adapter, and also an L-shaped latch extending transversely along the spindle.

DESCRIPTION OF FIGURES

The invention will be better understood and further details, features and advantages of the invention will become apparent from reading the following description given by way of non-limiting example and with reference to the appended drawings, in which.

DETAILED DESCRIPTION

It should be noted that the figures explain the invention in detail for implementing the invention, it being of course possible for said figures to serve to better define the invention if necessary.

In the following description, the terms 'longitudinal' or 'lateral' refer to the orientation of the wiper blade or of the driving arm according to the invention. The longitudinal direction corresponds to the main axis of the wiper blade or arm along which it extends, while the lateral orientations correspond to concurrent straight lines, that is to say straight lines which cross the longitudinal direction, notably perpendicular to the longitudinal axis of the wiper blade or arm in the plane in which it rotates. For longitudinal directions, the terms 'exterior' (or 'front') or interiors (or 'rear') are to be viewed from the point at which the wiper blade is fastened to the arm, the term 'interior' corresponding to the part where the arm and a half-blade extend, or from the point at which the arm is fastened to the vehicle. Finally, the directions referenced as 'upper' or 'lower' correspond to orientations perpendicular to the plane of rotation of the wiper blade, the term 'lower' containing the plane of the windscreen.

Figure 1:
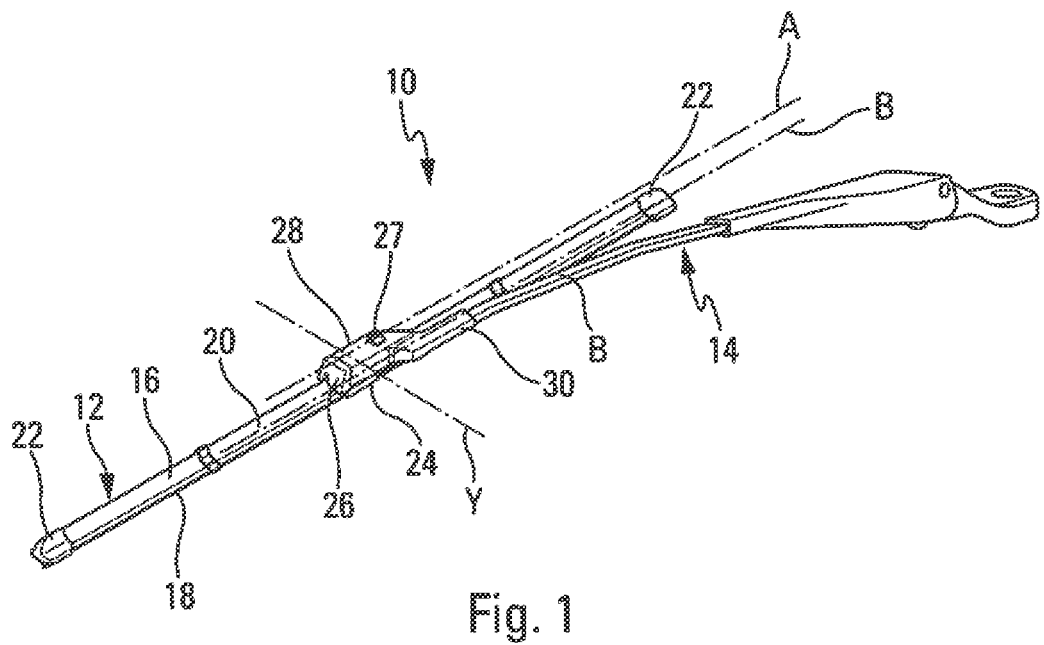
FIG. 1 is a schematic perspective view of a wiper, this wiper having a wiper blade and an arm for driving the wiper blade, which are connected to one another by a connection system.

FIG. 1 illustrates a windscreen wiper 10 comprising notably a wiper blade 12 and a driving arm 14 for driving the wiper blade 12. The driving arm forms a windscreen wiper arm.

The wiper blade 12 is preferably of the flat blade type and comprises a longitudinal body 16, a squeegee blade 18, generally made of rubber, and at least one vertebra which stiffens the squeegee blade and encourages it to press against a vehicle windscreen.

The body 16 of the wiper blade 12 may comprise an upper aerodynamic deflector 20 intended to improve the operation of the wiping system, the purpose of this deflector being to improve the pressing of the wiper blade against the windscreen and therefore the aerodynamic performance of the windscreen wiper.

The wiper blade 12 may further comprise end fittings 22 or clips for attaching the squeegee blade 18 and the vertebra to the body 16, these end fittings 22 being situated at each of the longitudinal ends of the body 16.

The wiper blade 12 comprises, substantially at its middle, an intermediate connector 24. An adapter 26 secured to the arm 14 is mounted on the connector 24 so as to maintain a degree of freedom to pivot about an articulation or pivoting axis Y which is a transverse axis substantially perpendicular to the longitudinal axis of the wiper blade 12. This degree of freedom allows the wiper blade 12 to pivot vis-à-vis the arm 14 and thus allows the wiper blade to follow the curvature of the windscreen as it moves. The adapter 26 can be detached from the arm 14 by pressing an actuation button, in this case a push button 27, carried by the adapter.

The arm 14 is intended to be driven by a motor to follow a back-and forth angular movement that allows water and possibly other undesirable elements with which the windscreen is covered to be evacuated. The adapter 26 provides the connection of the wiper blade 12 to the arm 14 and, in particular, to a head or terminal piece 28 of the arm which may be formed as one piece with the arm or attached and fastened thereto.

In the example shown, the terminal piece 28 of the arm forms a yoke having a transverse section substantially in the form of a U.

Figure 2:
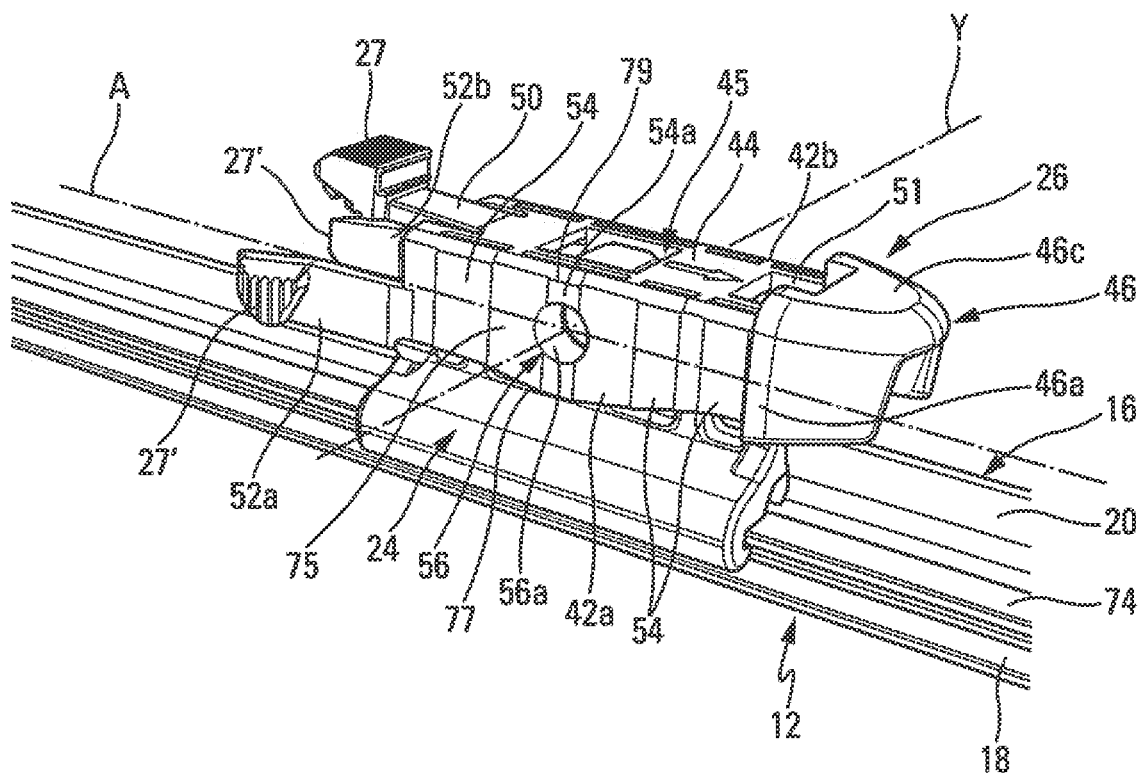
FIG. 2 is a schematic perspective view of a wiper blade equipped with an adapter according to the invention.

The terminal piece 28 has an elongate shape, the axis of elongation A of which is generally substantially parallel to the axis of elongation or longitudinal axis of the wiper blade 12. This is the longitudinal direction of the adapter. The terminal piece 28 comprises a part 30 for connecting to the rest of the arm 14, for example by crimping. This part 30 has an elongate overall shape and extends along an axis 13 substantially parallel to the longitudinal axis A and spaced apart from this axis, as can be seen in FIGS. 1 and 2. The part 30 is connected to a rear or interior end of the rest of the terminal piece 28.

The adapter 26 is of the 'universal' type and is designed to be mounted, without distinction, on the terminal pieces 28 of different arms, even on arms not equipped with terminal pieces, as will be described below in greater detail with reference to FIGS. 10 to 20.

FIGS. 2 to 9 show an embodiment of the adapter 26 according to the invention and also of the connector 24 designed to interact with this adapter, the adapter and the connector together forming a system for connecting the wiper blade 12 to the arm 14, or to one arm 14 amongst a plurality of types of arm.

The adapter 24 has a general elongate shape along the longitudinal axis A, otherwise called the longitudinal direction. it comprises a body comprising two lateral was 42*a*, 42*b*, for example substantially parallel to one another and to the longitudinal axis A and spaced apart from one another. These was 42*a*, 42*b* are connected together at their upper ends by an upper transverse wall 44 substantially perpendicular to the lateral was 42*a*, 42*b*. The was 42*a*, 42*b*, 44 here have an elongate shape in the longitudinal direction.

These lateral was 42*a* and 42*b* are both delimited by an internal face turned towards a housing 45 and by an external face referenced 75. This external face 75 is bordered by a lower longitudinal edge 77 and by an upper longitudinal edge 79 opposite the lower longitudinal edge 77.

The walls 42*a*, 42*b*, 44 of the adapter 26 between them define a longitudinal space, otherwise called a housing, 45, in which a part of the connector 24 is designed to be mounted. The walls 42*a*, 42*b* are, here, of the double-skin type and each comprise two skins, an internal skin and an external skin, respectively, which are parallel to and at a transverse distance from one another. The skins are connected together by transverse rectilinear ribs.

The body of the adapter 26 is connected, at a first of its longitudinal ends, to a fairing or cowling, also cased a cap or head 46. This head 46 has a lateral dimension greater than that of the body of the adapter and a height that is likewise greater than that of the body. The lateral walls 42*a*, 42*b* of the body of the adapter are thus set back or offset relative to external lateral faces 46*a* of the head, and its upper wall 44 is set back or offset relative to an external upper face 46*b* of the head.

The lateral faces 46*a* of the head 46 are connected to the lateral walls 42*a*, 42*b* of the body by lateral rear faces 48*a*, respectively, which extend substantially perpendicularly to the longitudinal axis A. The upper face 46*c* of the cap 48 is connected to the upper wall 44 of the body by another upper rear face 48*b* that also extends substantially perpendicularly to the longitudinal axis A.

The rear faces 48*a*, 48*b* of the head 46 form bearing faces of the exterior or front end of the terminal piece 28. More precisely, in the mounted position of the adapter in the terminal piece 28, the front free edges of the lateral legs of the terminal piece are designed to come to bear on the faces 48*a* and the front free edge of the transverse wall of the terminal piece is designed to come to bear on the face 48*b*.

The upper wall 44 of the body of the adapter 26 comprises, substantially at its middle, a window 49. The upper wall 44 comprises, at its longitudinal end opposite the head 46, longitudinal slots that are parallel to one another and to the longitudinal axis A and spaced apart from one another in such a manner as to define between them at least one portion of a longitudinal tongue 50.

The tongue 50 extends longitudinally on the side opposite the head 46, in the continuation of the upper wall 44. It is elastically deformable and is connected at its exterior or front free end to the aforementioned upper push button 27 that projects from the tongue 50. In the free state, without constraint, each tongue 50 is such that the push button 27 is located above a plane passing via the upper wall 44. Elastic deformations of the tongues occur, here, in a substantially vertical median longitudinal plane, i.e. substantially perpendicular to the upper wall 44. The adapter 26 is thus equipped with an upper push button 27.

When the adapter 26 is mounted in the terminal piece 28, the push button 27 is intended to be engaged by elastic snap-fitting in the opening 38 in order to lock the adapter vis-à-vis the terminal piece.

The adapter 26 further comprises an upper hole 51 for engagement of a tab of an arm terminal piece. Here, this hole 51 is formed in part in the head 46, at the rear end thereof, and in part in the upper wall 44, at the front end thereof. The hole 51 has a square or rectangular overall shape.

The lateral walls 42*a*, 42*b* of the body extend longitudinally towards the interior via elastically deformable longitudinal tabs 52*a*, 52*b*. Each wall 42*a*, 42*b* is connected to a tab 52*a*, 52*b*, these tabs 52*a*, 52*b* being substantially parallel and symmetrical relative to a substantially vertical median longitudinal plane, i.e. perpendicular to the upper wall 44 of the adapter. The free ends of the tabs 52*a*, 52*b*, which are located on the side opposite the head 46, each carry a projecting lateral push button 27'. Each tab 52*a*, 52*b* thus carries a push button 27". Elastic deformations of the tabs 52*a*, 52*b* occur, here, in a substantially horizontal longitudinal plane, i.e. substantially parallel to the upper wall 44. The tabs 52*a*, 52*b* may be brought closer together by elastic deformation. The push buttons 27" are formed in order to interact with notches of the terminal piece 26, as will be described in greater detail below.

The lateral walls 42*a*, 42*b* each comprise a through-hole 56. The holes 56 in the lateral walls 42*a*, 42*b* are substantially coaxial and, here, define the axis Y of pivoting of the adapter 24 on the connector 24 and thus of the wiper blade vis-à-vis the arm. The holes 56 are, for example, circular in section and each comprise a substantially cylindrical internal surface 56*a*. The holes 56 open at their external lateral ends on the external faces 75 of the walls 42a, 42b, respectively, and at their internal lateral ends in the housing 45.

The internal lateral faces facing the lateral was 42a, 42b comprise protuberances 60. Each lateral wall 42a, 42b comprises a protuberance 60, the protuberances here being opposite one another and extending substantially towards one another. The protuberances 60 are symmetrical relative to a median longitudinal plane of the adapter, perpendicular to the upper wall 44. Each protuberance 60 also has a plane of symmetry passing via the axis Y of pivoting and perpendicular to the longitudinal axis A.

Each protuberance 60 is holed and comprises a throughhole. This hole is, here, formed by one of the aforesaid holes 56. Each protuberance 60 is thus located on the internal face of the lateral wall 42a or 42b so as to be traversed by the hole 56 of this wall.

Each protuberance 60 has a cylindrical and, here, tubular general shape on account of the hole 56 traversing it. The axis of each hole 56, which is merged with the axis Y of pivoting, is likewise merged with the axis of the corresponding cylindrical protuberance 60, such that the hole is centred vis-à-vis the protuberance. Each protuberance 60 thus forms an annular bead of material around the hole 56, having, substantially, a radial thickness relative to the axis Y of pivoting that is substantially constant. Each protuberance 60 has an axial dimension along the axis Y of pivoting that represents approximately 10 to 20% of the axial dimension or width of the housing 45 along the axis Y of pivoting. Each protuberance 60 has an external diameter that represents approximately 60 to 80% of the height of the corresponding lateral wall 42a, 42b, measured in a direction substantially perpendicular to the axis Y of pivoting.

Figure 5:
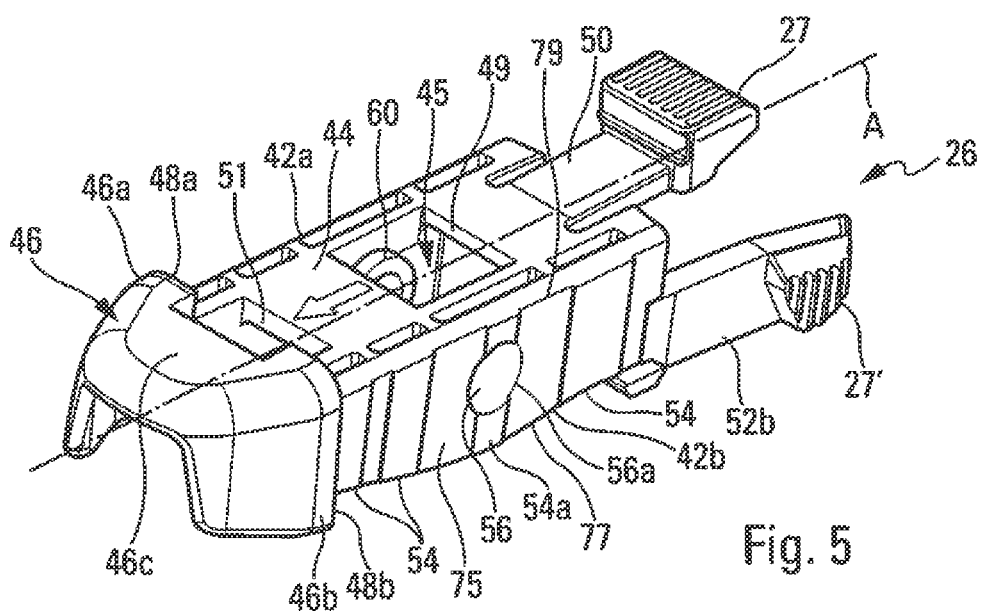
Figure 6:
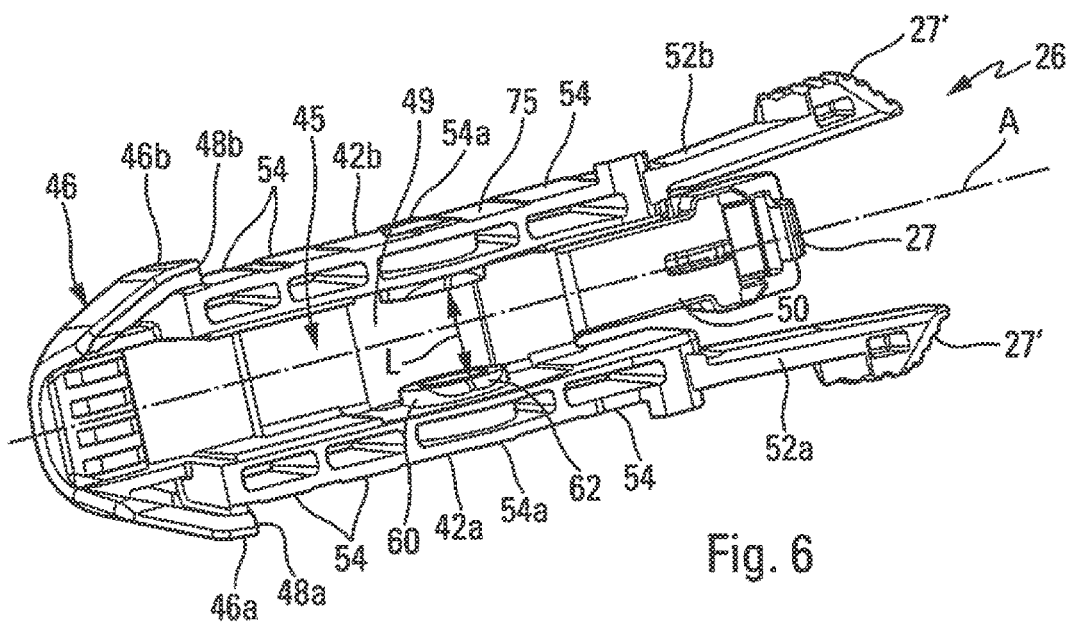
Figure 7:
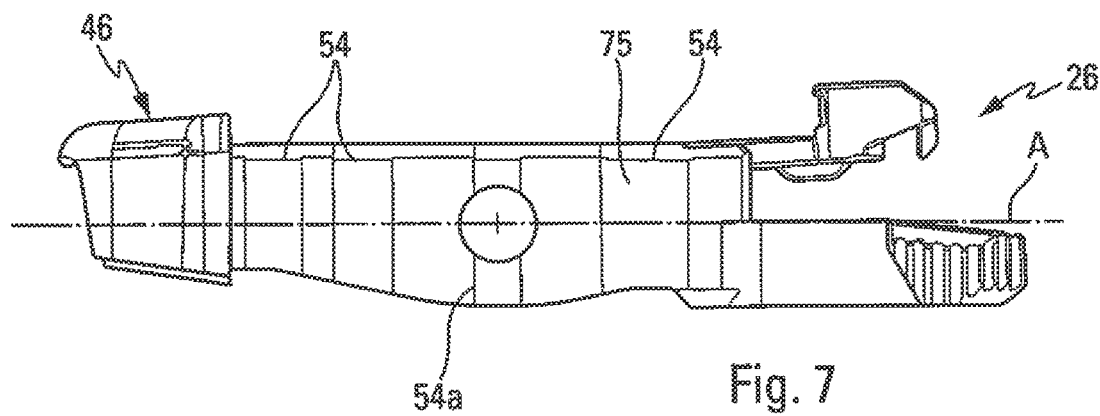
Figure 8:
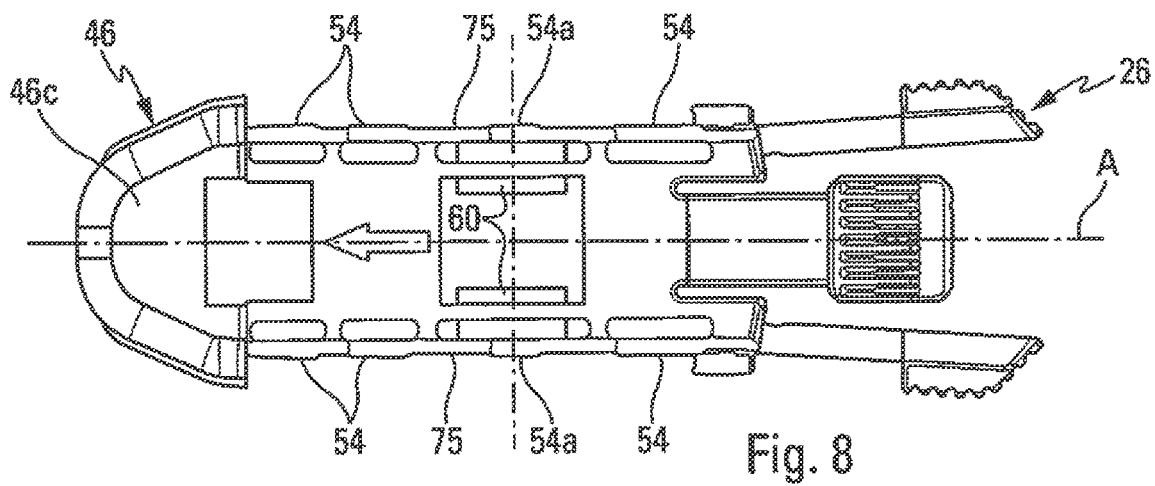

As may be seen in FIGS. 5 and 6, each protuberance 60 comprises a truncated or chamfered part, which, here, is a lower part. Each truncated or chamfered part defines a ramp 62 extending in an inclined plane relative to the lateral walls 42a, 42b. Each ramp 62 defines a sliding surface intended to interact with the connector 24. The ramps 62 of the protuberances 60 are inclined such that they diverge from one another from the top towards the bottom. Their lower ends, located on the side opposite the upper wall 44, are spaced apart from one another by a distance L along the axis Y of pivoting (FIG. 6). The lower end of each ramp 60 extends at a short distance, along the axis Y of pivoting, from the internal face of the corresponding lateral wall 42a, 42b and may be directly connected to this internal face. In this latter case, the distance L is substantially equal to the distance between the internal faces of the walls 42a, 42b or to the width of the housing 45. Each ramp 62 extends over a circumference about the axis of pivoting, representing an angle of between 30 and 150°, and preferably between 90 and 120°.

The lateral walls 42a, 42b of the body of the adapter 26 further comprise, on their external faces 75, one or more bearing means 54, 54a projecting from the external face 75 carrying them. This bearing means 54, 54a defines bearing faces in the transverse direction, i.e. perpendicularly to the longitudinal direction A passing via the lateral faces 42a and 42b.

At least some 54a of these projecting bearing means are located at the level of the holes 56 and are traversed by these holes 56. There is thus a geometric interference between the external perimeter of the hole 56 and the bearing means 54a.

The projecting bearing means 54, 54a here comprise bands 54, 54a of material projecting from the external faces 75 of the lateral was 42a, 42b. The bands of material have an elongate form and extend transversely to the longitudinal direction A between the lower 77 and upper 79 longitudinal edges of the lateral was 42a, 42b, the upper longitudinal edge being common to the upper wall 44.

The bands 54, 54a of material define bearing faces that are parallel or substantially parallel to one another, These bearing faces are likewise, here, parallel or substantially parallel to the external faces 75 of the lateral was 42a, 42b. A plane passing via the bearing face of one or more bands of material is thus parallel to a plane passing via the external face 75. A straight line passing via these bearing faces is also parallel or substantially parallel to the longitudinal axis A of the adapter 26.

The bands 54, 54a of material are spaced apart from one another in the longitudinal direction A and distributed over the lateral walls 42a, 42b in the same direction. In the example shown, each lateral wall comprises four of said bands 54, 54a of material. The bands of material of one of the lateral walls are symmetrical relative to the bands of material of the other of the lateral walls, relative to a median longitudinal plane of the adapter substantially perpendicular to its upper wall 44.

The bands 54, 54a of material all have substantially the same thickness measured in accordance with the axis Y of pivoting or dimension in the transverse direction, The bands 54a of material traversed by the holes 56 have a width or dimension in the longitudinal direction, measured in accordance with the longitudinal direction A, that is less than that of the other bands 54 of material and, for example, also less than the diameter of said holes 56.

The median transverse plane perpendicular to the upper wall 44 of the adapter 26 and passing via the axis Y of pivoting traverses the bands 54a of material substantially at their middle and may, for example, form a plane of symmetry of these bands. In other words, the hands 54a of material are in particular substantially centred on the axis Yr of pivoting and the holes 56.

The adapter 26 described above is advantageously a unit, i.e. constituted by one and the same synthetic material. It may thus be manufactured in the course of a single moulding operation, particularly by means of injection-moulding.

The adapter 26 is fastened to the connector 24 by virtue of the protuberances 60 that form means for fastening the adapter to the connector and which can furthermore form means for pivoting of the adapter vis-à-vis the connector. The fastening means are of the elastic snap-fit type, the protuberances 80 of the adapter 26 being designed to interact by elastic snap-fitting with complementary means of the connector 24.

Figure 3:
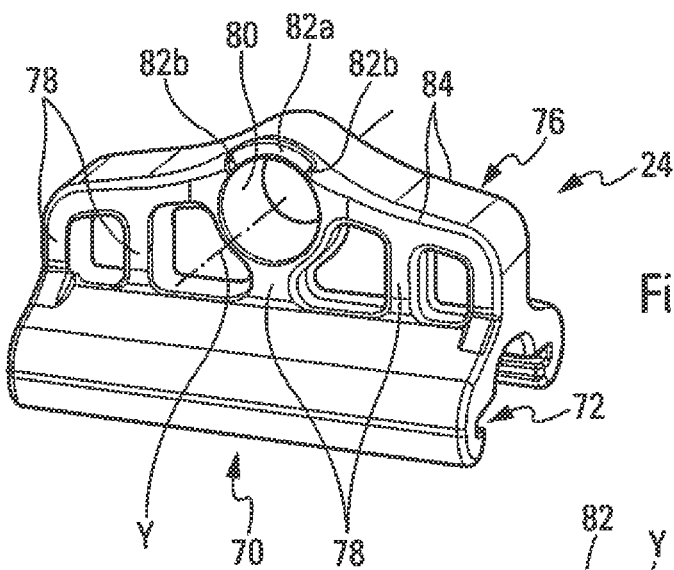
FIGS. 3 and 4 are schematic perspective views of a connector of the wiper blade of FIG. 2, FIGS. 5 to 8 are schematic perspective views of the adapter of FIG. 2, FIGS. 9 to 13 are schematic perspective views of the wiper blade of FIG. 2 and of different driving arms connected to the wiper blade by virtue of the adapter according to the invention.
Figure 4:
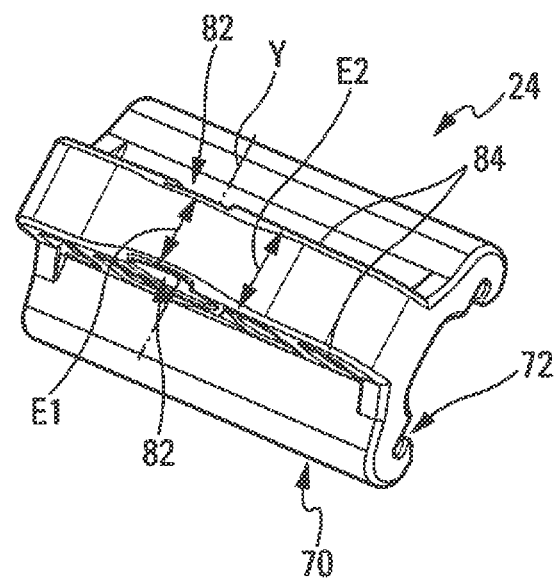

The connector 24, which can be better seen in FIGS. 3 and 4, is arranged so as to be rendered secure, for example by crimping, on the wiper blade 12. The connector 24 provides a 'complete' mechanical connection with the wiper blade 12, in the sense that there is no degree of freedom. The connector 24 may also provide a function of transporting and distributing a liquid for washing the vehicle windscreen.

The connector 24 comprises a base 70 extending longitudinally and transversely. This base 70 comprises a zone 72 of securing to the wiper blade 12 and, more particularly, to at least one vertebra 74 of this wiper blade. This zone 72 of securing has the form, for example, of a slit made in the base 70, this slit being bordered by two hooks capable of engaging on the wiper blade.

In the example shown, the wiper blade 12 comprises two parallel and coplanar vertebrae 74 spaced apart from one another in order to define a space for housing the squeegee blade 18 or the body 16 of the wiper blade. Each vertebra comprises a longitudinal edge opposite the squeegee blade 18, which is received in the slit of the connector 24.

The base 70 is surmounted by a flank 76, for example, made as one with the base. This flank 76 has a transverse dimension that is less than that of the base and a longitudinal dimension substantially equal to that of the base. The flank 76 is, for example, centred on the base 70, in accordance with the axis Y of pivoting. The flank 4 may have a plurality of ribs 78 that mechanically reinforce the flank.

The connector 24 and the adapter 26 are connected mechanically by a pivot connection. As far as the connector 24 is concerned, this pivot connection is implemented by a cavity 80 made in the flank 76. This cavity 80 extends in accordance with the axis Y of pivoting and has a circular section. It traverses the flank 76. In other words, the cavity 80 has a central axis centred on the axis Y of pivoting.

The connector 24 described above is advantageously a unit, i.e. constituted by one and the same synthetic material. This connector may thus be manufactured in the course of a single moulding operation, particularly by means of injection-moulding.

The adapter 26 is mounted on the connector 24 by elastic snap-fitting of its protuberances 60 into the cavity 80 of the connector. The ramps 62 of the protuberances 60 of the adapter 26 interact with the connector in order to facilitate this mounting. The connector, meanwhile, also comprises means facilitating an insertion of the protuberances 60 of the adapter 26 in its cavity 10.

Here, these means are provided on the flank 76 of the connector 24. In the present case, these means are grooves 82 made in the lateral faces delimiting the flank 76 and in line with which the cavity 80 terminates. It will be understood, here, that each groove 82 and the cavity 80 intersect one another, the groove 82 thus extending from a ridge 84 of the flank 76 as far as the hole forming the cavity 80. In line with each groove 82, the flank 76 has a thickness E1 that is less than a thickness E2 of a portion of the flank 76 bordering said groove 82. These thicknesses E1, E2 are measured in accordance with a direction parallel to the axis of pivoting. Thus formed, this groove 82 is delimited by a bottom 82a and by two portions 62b that connect the bottom 82a to the corresponding lateral face of the flank.

The bottoms 82a of the grooves 82 are parallel or inclined relative to one another. In this latter case, they are inclined such that their upper ends, located on the side opposite the cavity 80, are closer than are their lower ends.

The assembly of the adapter 26 on the connector 24 takes place solely by means of a vertical translation in accordance with an axis perpendicular to the upper wall 44 of the adapter. In the course of this translation, the protuberances 60 of the adapter 26 engage in the grooves 82 of the connector and interact with their portions 82b in order to centre the adapter on the connector. The ramps 62 have guide surfaces that interact by sliding with the bottoms 82a of the grooves. To that end, the aforesaid distance L is preferably greater than the thickness E1. Furthermore, the distance between protuberances 60, measured along the axis Y of pivoting, is less than the width of the cavity 80 and also the thickness E2.

Figure 9:
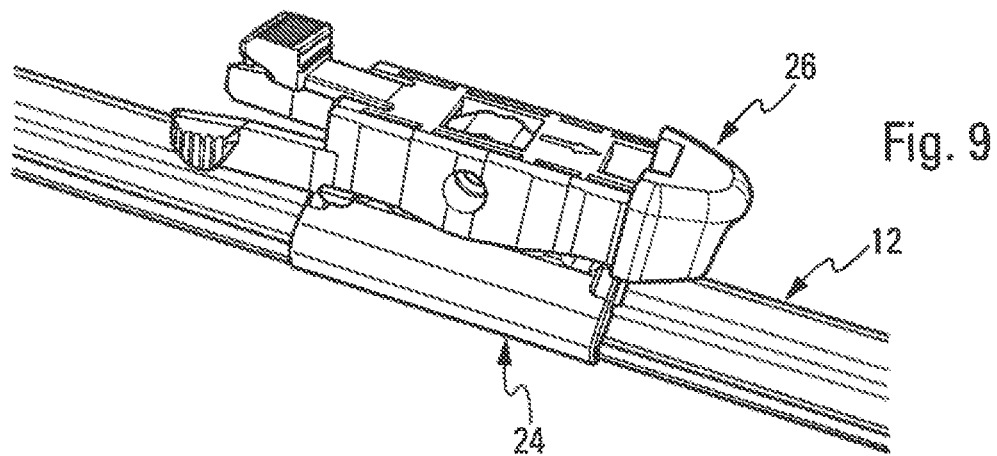

Upon insertion of the protuberances 60 into the grooves 82, the ramps 62 bear on the bottoms of the grooves and the downward translation of the adapter is continued such that the lateral walls 42a, 42 of the adapter are obliged to deform, with one separating from the other on account of the sliding of the ramps over the bottoms of the grooves. This operation is continued until the protuberances 60 engage by elastic snap-fitting or return in the cavity 80 of the connector. The adapter is then fastened to the connector and may, furthermore, pivot on same about the axis Y of pivoting, by means of interaction of its protuberances with the internal cylindrical surface 80a of the cavity. The cavity 80 has an internal diameter substantially equal to or slightly greater than that of the protuberances 60. The mounting shown in FIG. 9 is thus obtained.

As mentioned previously, the adapter 26 is of the universal type since it is capable of being fastened to a plurality of types of arms, be these arms with a terminal piece or arms without a terminal piece.

FIGS. 10 to 20 show several types of arms that can be equipped with the adapter 26 according to the invention.

Figure 10:
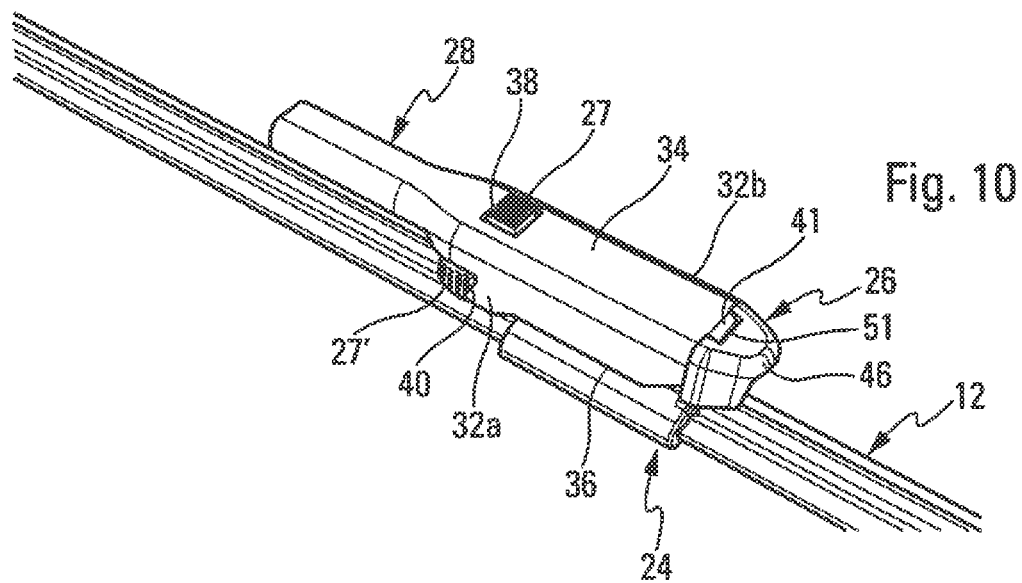
Figure 11:
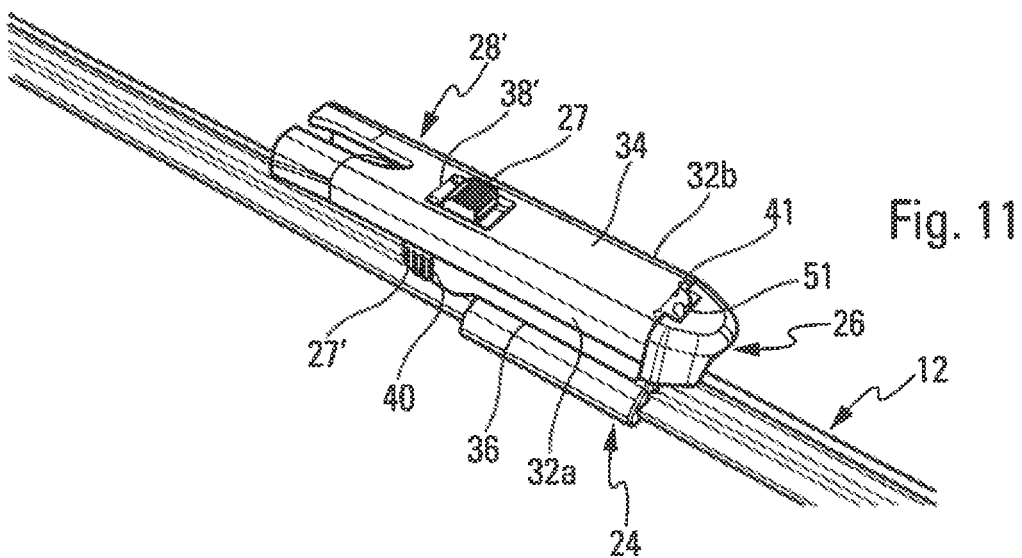
Figure 12:
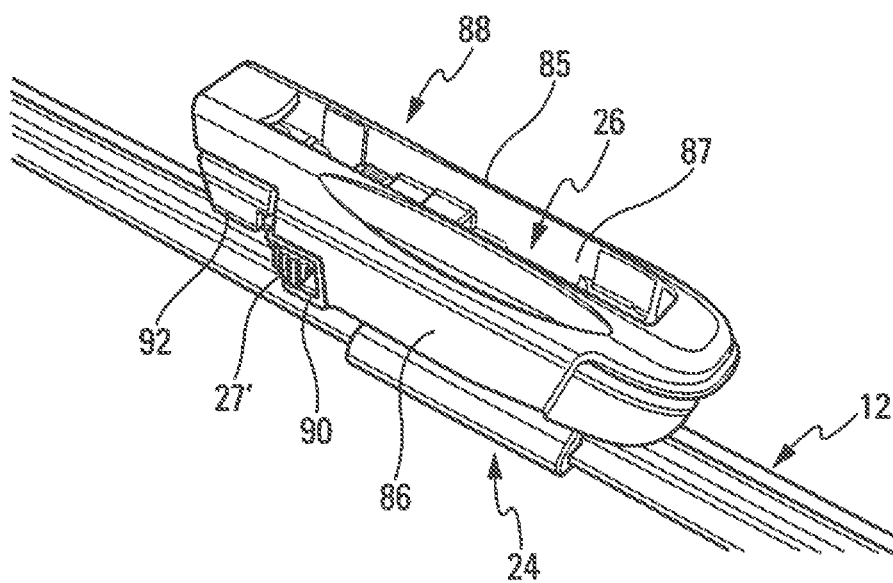
Figure 13:
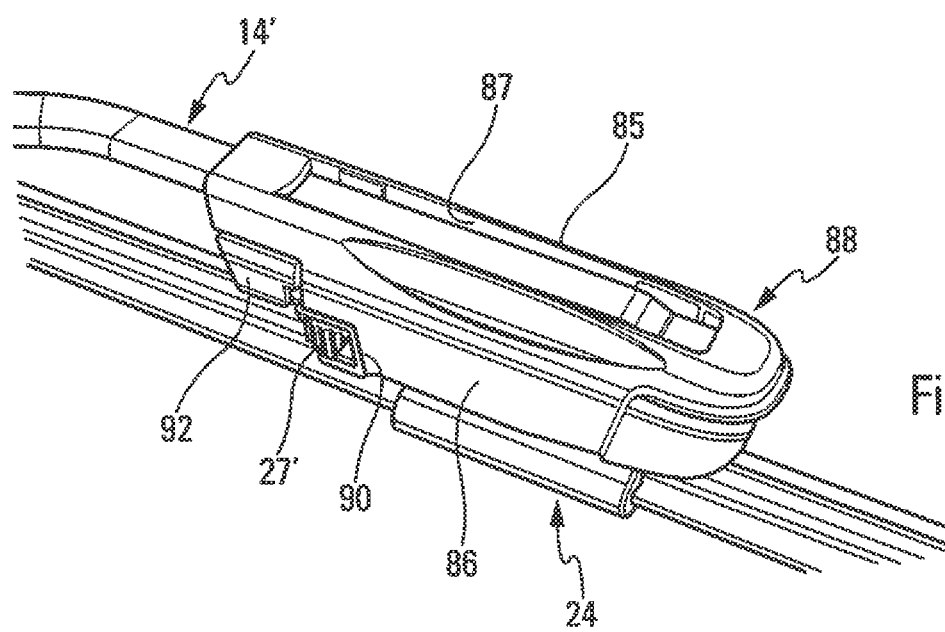
Figure 14:
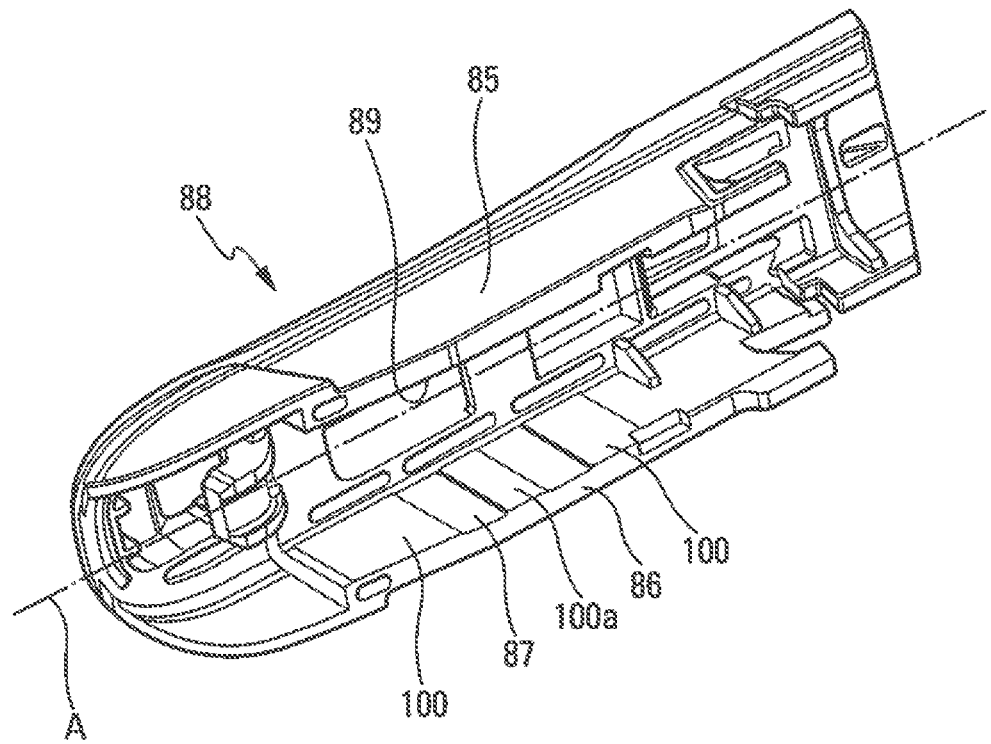
FIGS. 14 and 15 are schematic perspective views of a connection member visible in FIGS. 12 and 13, and FIGS. 16 to 20 are schematic perspective views of the wiper blade of FIG. 2 and of different driving arms connected to the wiper blade by virtue of the adapter according to the invention.

Reference is made, first, to FIGS. 10 and 11, which show, respectively, two terminal pieces 28, 28' of different driving arms.

Each terminal piece 28, 28' comprises two lateral legs 32a, 32b, the upper longitudinal edges of which are connected together by an upper transverse wall 34. Between them, the legs 32a, 32b and the wall 34 delimit a space for accommodating the adapter 26. The legs 32a, 32b may comprise, at the level of their lower longitudinal edges, means 36, such as hooks, for retention of the adapter 26 in the aforesaid space.

The upper wall 34 comprises a through-aperture 38, 38' designed to receive the upper push button 27. In the mounted position, the push button 27 is accommodated in this aperture 38 and is able to pass through the latter so as to project from the upper face of the wall 34. Mounting of the push button 27 in the aperture 38 takes place by means of simple engagement or fitting, preferably by elastic snap-fitting.

The lateral walls 32a, 32b may each comprise a notch 40 of a shape complementing a lateral push button 27'. In the mounted position, the lateral push buttons 27' are accommodated in these notches 40 and are able to traverse them so as to project from the external faces of the was 32a, 32b. Mounting of the push buttons 27" in the notches 40 takes place by means of simple engagement or fitting, preferably by elastic snap-fitting.

The terminal pieces 28, 28' are different. They have the same form overall but are different from one another in particular in terms of the dimensions and in terms of the shape and the size of their apertures 38, 38' or notches 40.

The upper was 34 of the terminal pieces 28, 28' continue towards the exterior in order each to form a tab 41 with a longitudinal section substantially in the form of an S, which is configured in order to be engaged in the hole 51 of the adapter 26.

The terminal pieces 28, 28' have substantially the same external width. Furthermore, the ribs 54 of the external faces of the lateral walls of the body of the adapter 26 may be spaced from one wall to the other by a transverse distance substantially equal to the internal width of the transverse piece 28, 28', such that the terminal piece is wedged in the transverse direction by means of interaction of its legs with the lateral walls of the body of the adapter.

A description will now be given of the assembly of the adapter 26 according to the invention on each of the terminal pieces 28, 28'.

The adapter 26 is engaged in the terminal piece 28, 28° by first inclining the axis of the adapter vis-à-vis axis A of the terminal piece 28 then engaging the tab 41 of the terminal piece in the hole 51 of the adapter. Upon this engagement, the legs of the terminal piece start by sliding on the bearing means 54 of the adapter. Furthermore, the front end edge of the upper wall of the terminal piece comes to bear on the face 48b of the head 46 of the adapter. The rear end of the adapter is then brought closer to the terminal piece until the lateral push buttons 27' engage by elastic snap-fitting in the notches 40 of the terminal piece 28, 28', The front end edges of the lateral legs 32a, 32b of the terminal piece come to bear on the faces 48a of the head 48 of the adapter. The longitudinal axes of the adapter and of the terminal piece 28 are thus substantially parallel.

Reference is now made to FIGS. 12 to 15, in which the adapter 26 is connected to an arm 14 of the rod arm type, i.e. an arm without a supplementary terminal piece, by means of a first connection member 88.

This connection member 88 is mounted on the adapter 26 and covers it fully in the example shown. It has a longitudinal form and comprises an internal housing in which the adapter is mounted and retained. At its rear end, it comprises lateral notches designed to receive the push buttons 27', respectively, by means of elastic snap-fitting.

Lateral walls 85, 86 of the member 88 comprise, on their internal faces 87, 89, projecting means 100, 100a defining bearing faces in the transverse direction and configured in order to interact with the projecting bearing means 54, 54a of the adapter 26.

The projecting means 100, 100a of the member 88 here comprise bands 100, 100a of material projecting from the internal faces 87 and 89 of the lateral walls 85, 86 of the member 88. The bands of material have an elongate form and extend longitudinally between the lower and upper longitudinal edges of these walls.

The bands 100, 100a of material define bearing faces that are substantially parallel. These bearing surfaces are, here, substantially parallel to the internal faces 87, 89 of the lateral walls and also to the longitudinal axis A of the member 88.

The bands 100, 100a of material are spaced apart from one another in the longitudinal direction and distributed over the lateral walls 85, 86 in the same direction. In the example shown, each lateral wall comprises three of said bands of material. The bands of material of one of the lateral walls are symmetrical relative to the bands of material of the other of the lateral walls, relative to a median longitudinal plane of the member perpendicular to its upper wall.

The bands of material all have substantially the same thickness or dimension in the transverse direction, measured in accordance with the axis Y of pivoting. The median bands 100a of material have a width or dimension in the longitudinal direction, measured in accordance with the longitudinal direction A, that is less than that of the other bands of material.

Figure 15:
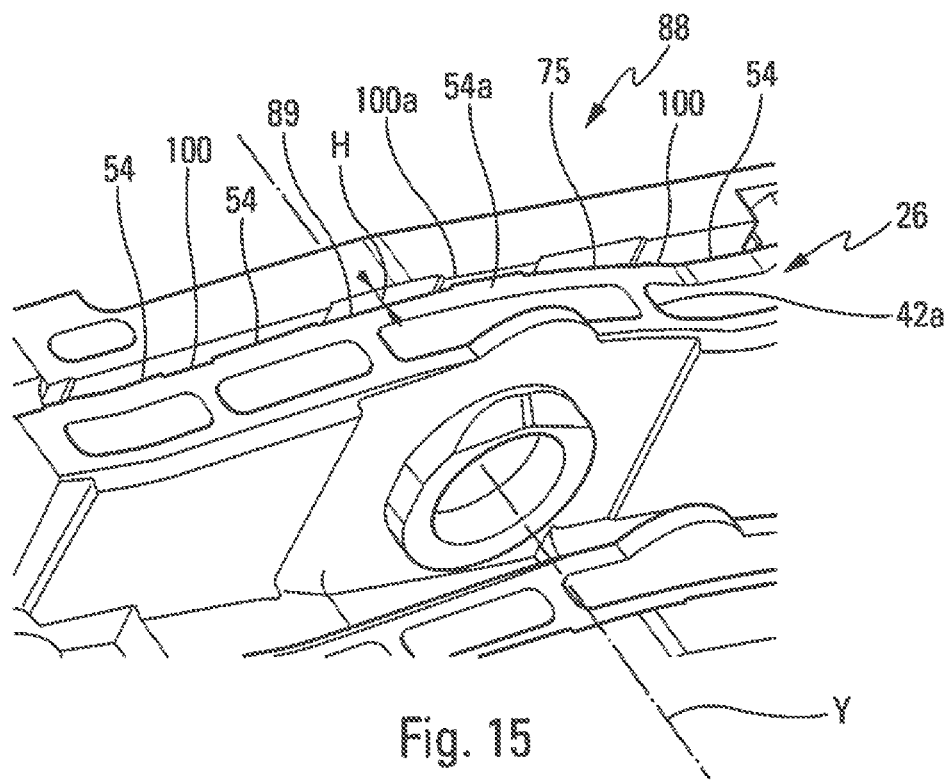

As may be seen in FIG. 15, the external faces 75 of the lateral walls 42a of the adapter 26 are spaced by a distance H in the transverse direction, i.e. in accordance with the axis Y of pivoting, of the internal faces 89 of the connection member 88, owing to mutual interaction of their bands 54, 54a, 100, 100a of material.

The rod arm 14' comprises an end engaged in the connection member 88 over substantially the entire length thereof, from the rear longitudinal end of the member 88. The rod arm 14° is secured to the member 88 by appropriate means and may be detached from the member by actuation of push buttons 92 carried by the member and designed to interact with the end of the rod arm 14'.

Figure 16:
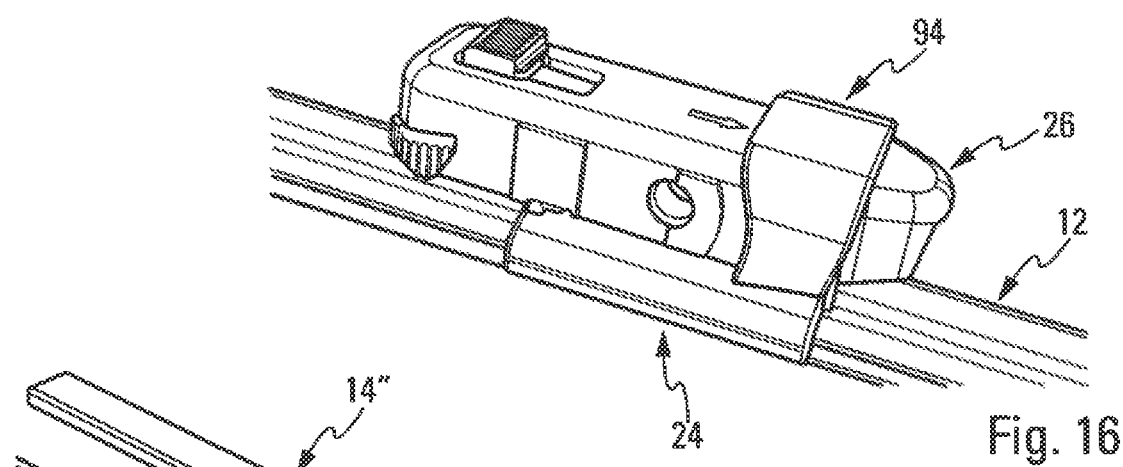
Figure 17:
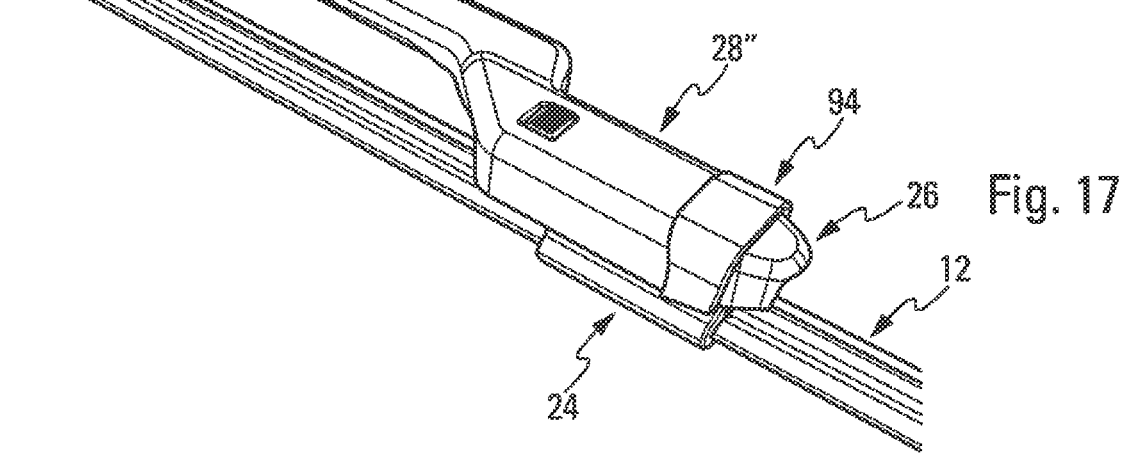
Figure 18:
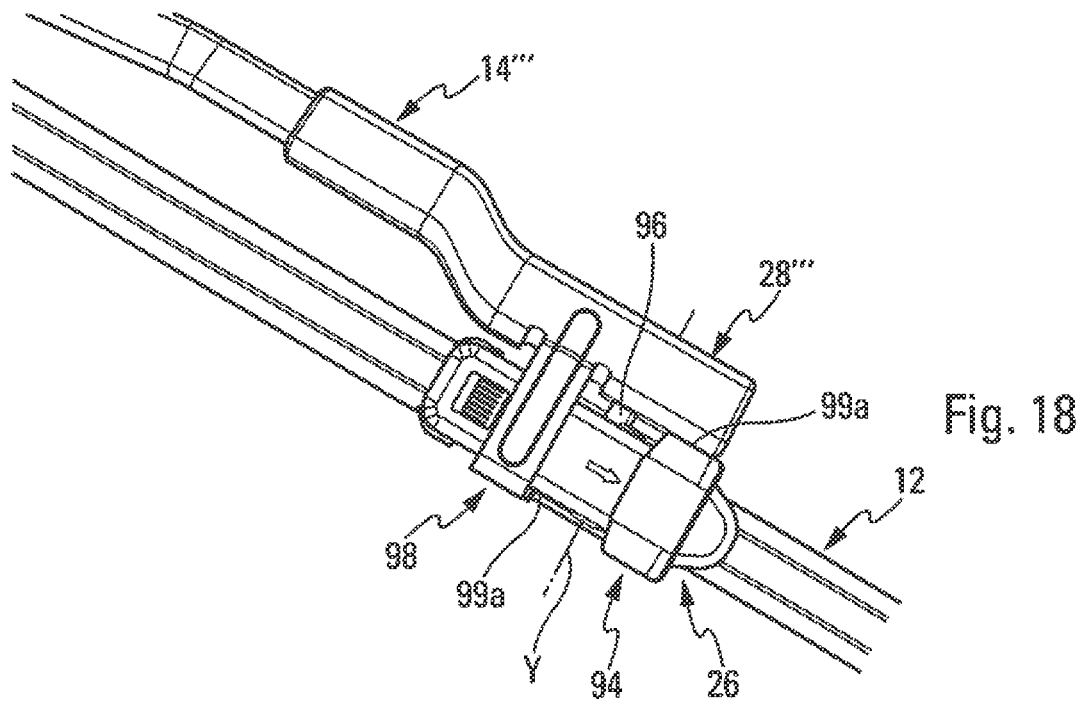

FIG. 16 shows a second connection member 94 that may be used to connect the adapter 26 to two other types of arms, shown, respectively, in FIGS. 17 and 18.

The connection member 94 is similar to the adapter and is designed to be mounted on the adapter in order to cover the latter at least in part. It is, in particular, used in order to be able to equip an arm 14" provided with a broad terminal piece 28" with the adapter 26. The terminal piece 28" of the arm 14" in FIG. 17 differs from those of FIGS. 10 and 11 particularly in that it is broader. The connection member 94 is configured in order to take up the clearances between the adapter 26 and the terminal piece 28" and in order to match the forms of these latter, being sandwiched between them. The terminal piece 28" is similar to those of FIGS. 10 and 11.

The arm 14''' of FIG. 18 is an arm with lateral locking (a side-lock arm), the terminal piece 28''' of which comprises, first, a cylindrical spindle 96 extending transversely on one side of the terminal piece and also an L-shaped latch 98 extending transversely on the same side as the spindle 96 and parallel to and at a distance from the latter.

The spindle 96 is designed to traverse lateral holes of the member 94 that are aligned on the axis Y of pivoting and thus aligned with the holes 56 of the adapter 26 and the cavity 80 of the connector 24. The spindle 96 is engaged in these holes and cavities until its transverse piece 28''' bears on an external lateral face 99a of the member 94. The transverse piece 28''' is able to interact by sliding with the external lateral face 99a upon pivoting of the wiper blade vis-à-vis the arm 14'''.

The L-latch 98 comprises a hook at its free end that is designed to interact by sliding with an opposite lateral face 99b of the member 94 upon pivoting of the wiper blade vis-à-vis the arm 14''', and prevents accidental detachment of the wiper blade from the arm during operation.

Figure 19:
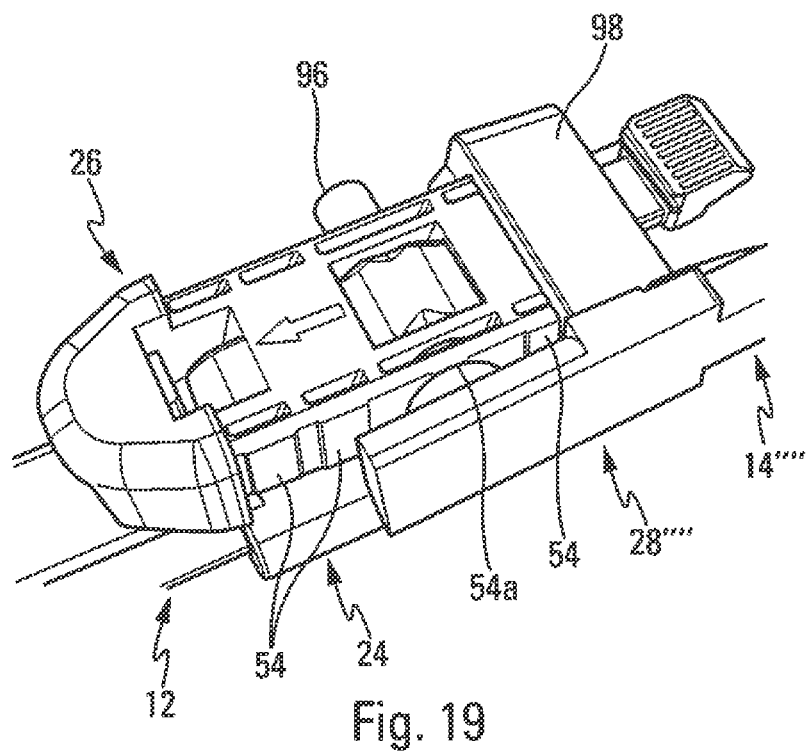
Figure 20:
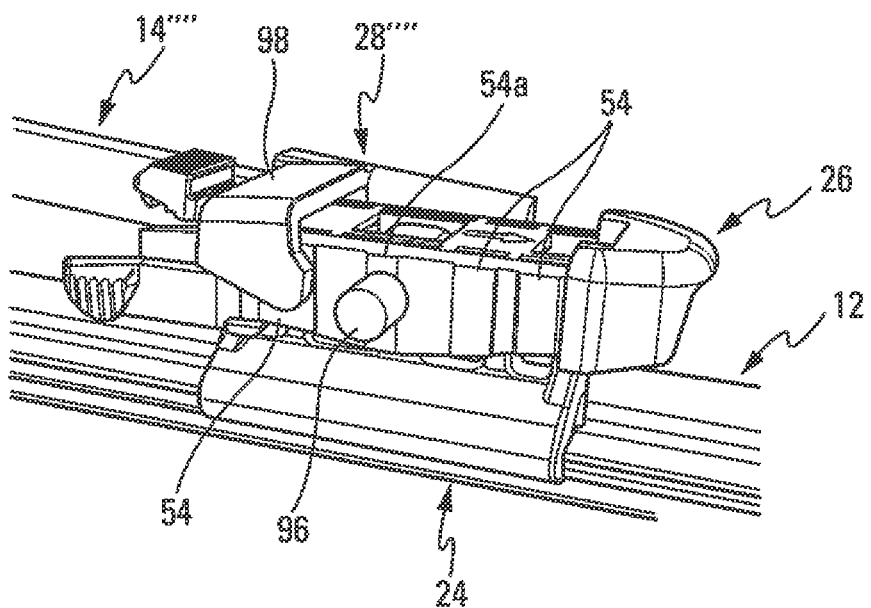

The arm 14''' of FIGS. 19 and 20 is another arm with lateral locking, the terminal piece 28''' of which also comprises a cylindrical spindle 96 extending transversely on one side of the terminal piece and also an L-shaped latch 98 extending transversely on the same side as the spindle 96 and parallel to and at a distance from the latter.

Unlike the preceding embodiment, the arm 14"" here interacts directly with the adapter 26 according to the invention, without the interposition of a piece. The spindle 96 is designed to traverse the holes 56 of the adapter 26 and the cavity 80 of the connector. The spindle 96 is engaged in these holes and the cavity until its transverse piece 28"" bears on the bearing face of one of the bands 54a of material traversed by the hole 56. The transverse piece 28"" is able to interact by sliding with this bearing face upon pivoting of the wiper blade vis-à-vis the arm.

The L-latch 98 comprises a hook at its free end that is designed to interact by sliding with the bearing face of one of the bands 54 of material on the other side of the adapter 26, and prevents accidental detachment of the wiper blade from the arm during operation. The bands 54, 54a of material on which the arm 14"" bears and is able to slide during operation are located, respectively, on the two sides of the adapter 26. The bands 54, 54a of material thus make it possible to take up the transverse clearances of the prior art between the adapter and the terminal piece of the arm 14"".

The universal adapter 26 according to the invention may thus be combined with a plurality of types of driving arm.

The invention claimed is:

1. An adapter for connecting a wiper blade to a driving arm, the adapter comprising:
   two lateral walls spaced apart from one another so as to form therebetween at least one housing configured in order to receive at least in part a connector of the wiper blade,
   at least one of the lateral walls comprising at least one hole, and a bearing means projecting from an external face of the lateral wall, wherein the bearing means is traversed by the at least one hole, said bearing means being made as one with the external face of the lateral wall, wherein said bearing means comprises a plurality of bands of material projecting from the external face of each lateral wall that have substantially same thickness measured in a transverse direction orthogonal to the external face, where said same thickness extends a thickness of the lateral wall and the plurality of bands of material being parallel to each other along a vertical direction, wherein at least one of the plurality of bands of material is traversed by the at least one hole and has a dimension, in a longitudinal direction orthogonal to the transverse direction and the vertical direction, that is less than a diameter of the at least one hole, and wherein the at least one hole has a depth along the transverse direction that equals said same thickness added to the thickness of the lateral wall.

2. The adapter according to claim 1, wherein the two lateral longitudinal walls are substantially parallel.

3. The adapter according to claim 2, wherein each of the lateral walls comprises a through-hole, among the at least one hole, of an axis perpendicular to the longitudinal direction of the adapter.

4. The adapter according to claim 1, wherein the hole(s) is (are) configured to receive at least one articulation pin of the adapter vis-a-vis the connector.

5. The adapter according to claim 1, wherein the bearing means projecting from the external face of the lateral wall is configured to form at least one bearing surface in the transverse direction transverse to the longitudinal direction of the adapter.

6. The adapter according to claim 1, wherein said plurality of bands of material have an elongate form and extend longitudinally between lower longitudinal edges and upper longitudinal edges of the walls.

7. The adapter according to claim 1, wherein said plurality of bands of material define bearing faces that are substantially parallel to one another.

8. The adapter according to claim 1, wherein said plurality of bands of material are spaced apart from one another in the longitudinal direction of the adapter and distributed over said external faces in the same direction.

9. The adapter according to claim 1, wherein each lateral wall comprises at least four of said bands of material.

10. The adapter according to claim 1, wherein the plurality of bands of material traversed by the at least one hole have a width measured in the longitudinal direction of the adapter that is less than that of the other bands of material.

11. The adapter according to claim 1, wherein the plurality of bands of material traversed by the at least one hole have a width measured in the longitudinal direction of the adapter that is less than the diameter of said holes.

12. The adapter according to claim 1, wherein it is configured in order to be fastened selectively to a terminal piece of a first arm and to a terminal piece of a second arm, which is different from that of the first arm, said adapter comprising at one end a head defining at least a first bearing surface of a terminal piece part and/or at least a part of an engagement hole of a terminal piece part.

13. The adapter according to claim 12, further comprising at least one locking push button configured in order to interact with the terminal piece of said first and/or second arm.

14. The adapter according to claim 1, the adapter being configured to be fastened selectively to at least one connection member arranged in order to be fastened to at least one other arm.

15. An assembly comprising an adapter according to claim 1 and a connector secured to the wiper blade.

16. A wiper blade or driving arm comprising an adapter according to claim 1.

17. An assembly comprising a driving arm and an adapter according to claim 1, the driving arm comprising a transverse spindle received in at least one of the holes of the adapter, and also an L-shaped latch extending transversely along the spindle.

18. An assembly comprising:
an adapter for connecting a wiper blade to a driving arm, the adapter comprising:
two lateral longitudinal walls spaced apart from one another so as to form therebetween at least one housing configured in order to receive at least in part a connector of the wiper blade,
at least one of the lateral walls comprising at least one hole, and
a bearing means projecting from an external face of the lateral wall,
wherein the bearing means is traversed by the at least one hole, said bearing means being made as one with the external face of the lateral wall,
wherein said bearing means comprise a plurality of bands of material projecting from the external face of each lateral wall that have substantially same thickness measured in a direction orthogonal to the external face,
wherein at least one of the plurality of bands of material is traversed by the at least one hole, and
wherein the adapter is configured to be fastened selectively to at least one connection member arranged in order to be fastened to at least one other arm; and
said connection member which is configured to cover at least in part said adapter,
wherein said connection member comprises two lateral longitudinal walls designed to extend substantially parallel to the lateral walls of the adapter, and
wherein the two lateral longitudinal walls comprises on their internal faces projecting means which are configured to bear in a transverse direction on the bearing means of the lateral walls of the adapter.

19. An assembly comprising:
an adapter for connecting a wiper blade to a driving arm, the adapter comprising:
two lateral longitudinal walls spaced apart from one another so as to form therebetween at least one housing configured in order to receive at least in part a connector of the wiper blade,
at least one of the lateral walls comprising at least one hole, and
a bearing means projecting from an external face of the lateral wall,
wherein the bearing means is traversed by the at least one hole, said bearing means being made as one with the external face of the lateral wall,
wherein said bearing means comprise a plurality of bands of material projecting from the external face of each lateral wall that have substantially same thickness measured in a direction orthogonal to the external face,
wherein at least one of the plurality of bands of material is traversed by the at least one hole, and wherein the adapter is configured to be fastened selectively to at least one connection member arranged in order to be fastened to at least one other arm; and
said connection member which is configured to cover at least in part said adapter,
wherein said connection member comprises two lateral longitudinal walls designed to extend substantially parallel to the lateral walls of the adapter,
wherein the two lateral longitudinal walls comprises on their internal faces projecting means which are configured to bear in a transverse direction on the bearing means of the lateral walls of the adapter, and
wherein the external faces of the lateral walls of the adapter are spaced in the transverse direction of internal lateral faces of the connection member owing to the mutual interaction of said bearing means.

\* \* \* \* \*